March 31, 1925.

H. J. RUCHIE

SPRING WHEEL

Filed April 21, 1924

1,531,981

INVENTOR:
Henry J. Ruchie.
BY A. M. Carlsen
ATTORNEY.

Patented Mar. 31, 1925.

1,531,981

UNITED STATES PATENT OFFICE.

HENRY J. RUCHIE, OF ST. PAUL, MINNESOTA.

SPRING WHEEL.

Application filed April 21, 1924. Serial No. 707,842.

*To all whom it may concern:*

Be it known that I, HENRY J. RUCHIE, a citizen of the United States, residing at St. Paul, in the county of Ramsey and State of Minnesota, have invented certain new and useful Improvements in Spring Wheels, of which the following is a specification.

My invention relates to spring wheels for vehicles and the object is to provide a novel, inexpensive supporting wheel for automobiles and other vehicles, the spokes of the wheel involving springs so arranged that they support the vehicle axle in a manner which reduces the need of pneumatic tires and body springs for the vehicle.

Figures 1, 2, 3:
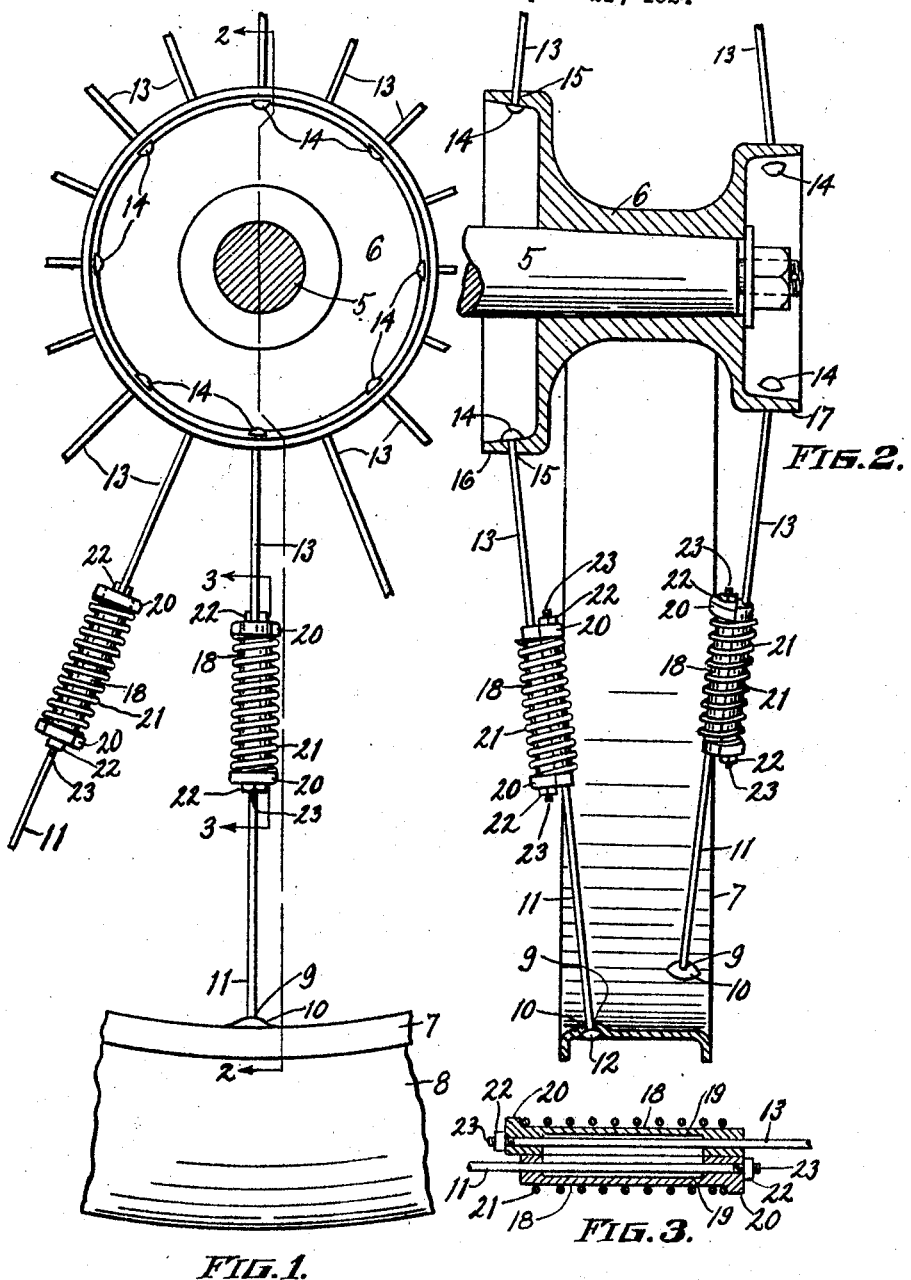
Fig. 1 is a side elevation of a portion of my improved wheel.
Fig. 2 is a section about as on the line 2—2 in Fig. 1.
Fig. 3 is an enlarged section about as on line 3—3 in Fig. 1.

Referring to the drawing by reference numerals, 5 designates any axle upon which a wheel hub 6 is either fixed as a driver or rotates as in ordinary vehicle supporting wheels. 7 is the rim and 8 the tire of the wheel. The rim is provided with several apertures 9 in bulged portions 10 for spoke members 11 having a head 12 to retain them in the rim.

Each spoke consists of one of said members 11 and another member 13 which is retained by a head 14 in a hole 15 in a flange 16 of the wheel hub 6 or in flange 17 of the hub.

Between the hub and the rim the two members of each spoke are overlapped and inserted each one into a semi-cylindrical block 18 having a cavity 19 to reduce its weight, and at one end a flange 20. The two blocks of each spoke are placed with their flat sides together and held in slidable relation to each other by a compression coil spring 21 which is in compression between the flanges 20 and said compression may be regulated by nuts 22 threaded upon the protruding ends of the spoke members.

The springs are made of various carrying capacities for different sizes of vehicles and may be regulated by turning of the nuts 22.

I claim:

1. A vehicle wheel having its hub and rim connected by spokes, each of said spokes composed of two rod like members having their adjacent ends overlapped, two blocks slidable one upon each overlapping spoke portion and having flat sides placed against each other, said blocks having each at one end an external flange, a compression coil spring encircling the two blocks and being partly compressed between said flanges, and means retaining the blocks upon the spoke sections.

2. The structure specified in claim 1, in which the said retaining means consists of nuts threaded upon the ends of the spoke sections.

3. The structure specified in claim 1, in which the said retaining means consists of nuts threaded upon the ends of the spoke sections and said blocks are semi-cylindrical in cross section.

4. The structure specified in claim 1, in which the blocks have their adjacent sides formed with cavities.

In testimony whereof I affix my signature.

HENRY J. RUCHIE.